Sept. 9, 1969  W. HAHN ET AL  3,465,661
PHOTOGRAPHIC CAMERAS
Filed March 3, 1967  2 Sheets-Sheet 1

INVENTORS
WERNER HAHN
ROLF NOACK
By Young & Thompson
ATTYS.

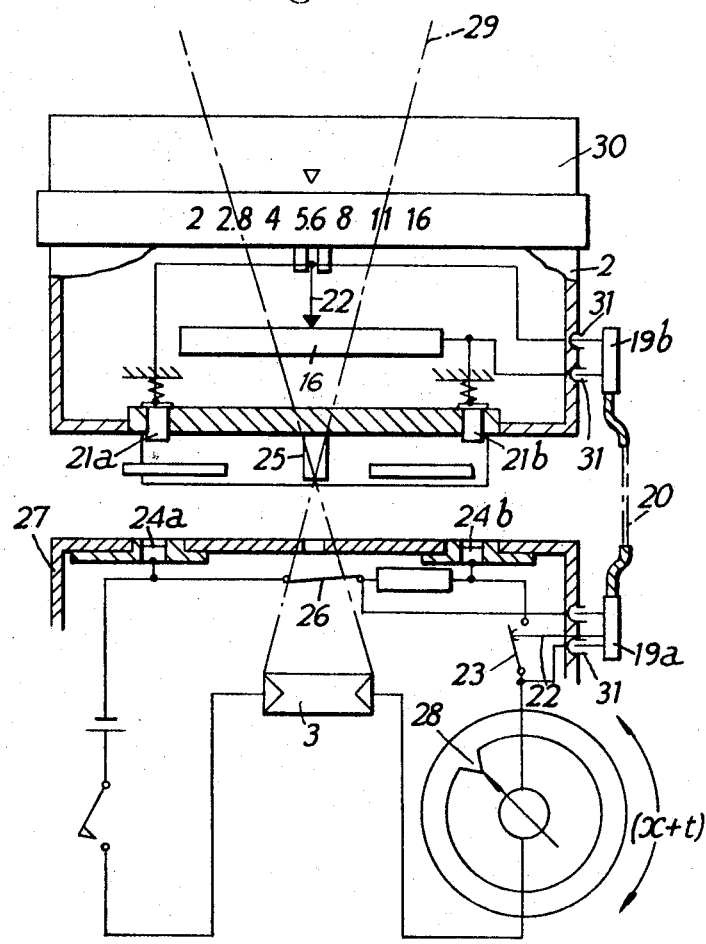

United States Patent Office 3,465,661
Patented Sept. 9, 1969

3,465,661
PHOTOGRAPHIC CAMERAS
Werner Hahn and Rolf Noack, Dresden, Germany, assignors to VEB Pentacon Dresden Kamera- und Kinowerke, Dresden, Germany
Filed Mar. 3, 1967, Ser. No. 620,314
Int. Cl. G03b 3/00, 9/02; G01j 1/00
U.S. Cl. 95—44    5 Claims

ABSTRACT OF THE DISCLOSURE

The camera is provided with an interchangeable objective mounted on the camera housing. An exposure measuring device has a photoelectric cell, a galvanometer and a switch arranger within the camera housing and an adjustable resistor arranged within the objective. The objective has opening means which, when the objective is mounted on the housing, open the switch so that the adjustable resistor controls the current through the galvanometer, said adjustable resistor being electrically connected to the galvanometer via cooperating electrical contacts provided on the objective and housing. With the objective mounted on the housing the camera diaphragm can be adjusted until the galvanometer needle is opposite its zero mark. This is termed "dark measuring." With the objective not mounted the switch is closed so that the galvanometer will indicate a reading, the diaphragm remaining completely open for viewing purposes. This is termed "bright measuring."

BACKGROUND TO THE INVENTION

The invention relates to a photographic camera with interchangeable objectives and with an exposure measuring device, of which the photoelectric cell is situated in the path of the "taking" rays, counter-contacts being provided on the camera housing which can be caused to engage contacts on the interchangeable objectives and which are electroconductively connected with the exposure measuring device.

In known cameras with photoelectric cells situated in the path of the "taking" rays, the lens diaphragm is closed, during the measuring operation, in accordance with the diaphragm aperture to which it has been set, so that regardless of the light intensity of the interchangeable objective mounted the light passing through the objective is accurately detected. In order, in particular, to be able to measure the brightness of the subject when the diaphragm is opened to its fullest extent, in the case of single-lens reflex cameras, another known type of camera with interchangeable objectives has mechanical couplings between the diaphragm adjusting devices on the objective side and the exposure measuring device on the camera side. Besides necessitating additional means for adapting the exposure measuring device on the camera side to the different initial apertures of the interchangeable lens, this construction only enables those interchangeable lenses to be used which are fitted with coupling devices of the same kind, adapted to the camera. Further difficulties arise in the use of intermediate rings and bellows-type closeup devices, which, in order to fulfil their function, likewise have to be equipped with such coupling and transmission devices of the same kind.

The purpose of the invention is to avoid the aforementioned drawbacks, and the task on which it is based is that of enabling the exposure measuring device on the camera side to be used, without detracting from its suitability for the performance of its function, with different types of objective and also with intermediate rings and bellows-type closeup devices.

SUMMARY OF INVENTION

According to the invention there is provided a photographic camera having a detachable objective mounted on the camera housing, a moving coil galvanometer of an exposure measuring device in the housing, a photoelectric cell of said device being arranged within said housing in the light path through the optical system of the camera and being electrically connected with said galvanometer to control the current through the measuring device when a switch in the circuit of the latter is closed, an adjustable resistor within said objective, and an aperture diaphragm of which the aperture size thereof can be preselected by a diaphragm setting device which is operatively connected with said adjustable resistor to vary the effective resistance thereof in dependance upon the aperture setting, wherein opening means for said switch and electrical contact means are provided whereby with the objective mounted on the housing the switch is opened and the adjustable resistor connected into the circuit of the measuring device, and with the objective detached the switch is closed so that the current in the measuring device is controlled by the photoelectric cell. The disconnecting switch on the camera side also renders possible the use of conventional interchangeable objectives of the kind having no adjustable resistance coupled with the diaphragm adjusting device. In one advantageous embodiment of the invention the disconnecting switch is capable of being operated by a control pin provided on the interchangeable objective. This makes it unnecessary for the photographer to operate a separate switch. If necessary the required connection between objective and camera can also be produced in the known manner by means of an electric cable, and this system, in particular, facilitates the use of intermediate rings or bellows-type closeup devices. It is advisable for contact sleeves, electroconductively connected with the contacts and counter-contacts, to be provided on the interchangeable objective and on the camera housing, contact plugs interconnected by a cable being insertable into the said sleeves. This renders the aforementioned electrical connecting cable unnecessary when an interchangeable objective is directly connected to the camera.

BRIEF DESCRIPTION OF DRAWINGS

The details of the invention are illustrated and explained in connection with practical examples. In the accompanying drawings:

FIGURE 2 shows an arrangement with a regulating resistance.

DESCRIPTION OF PREFERRED EMBODIMENTS

Figure 1:
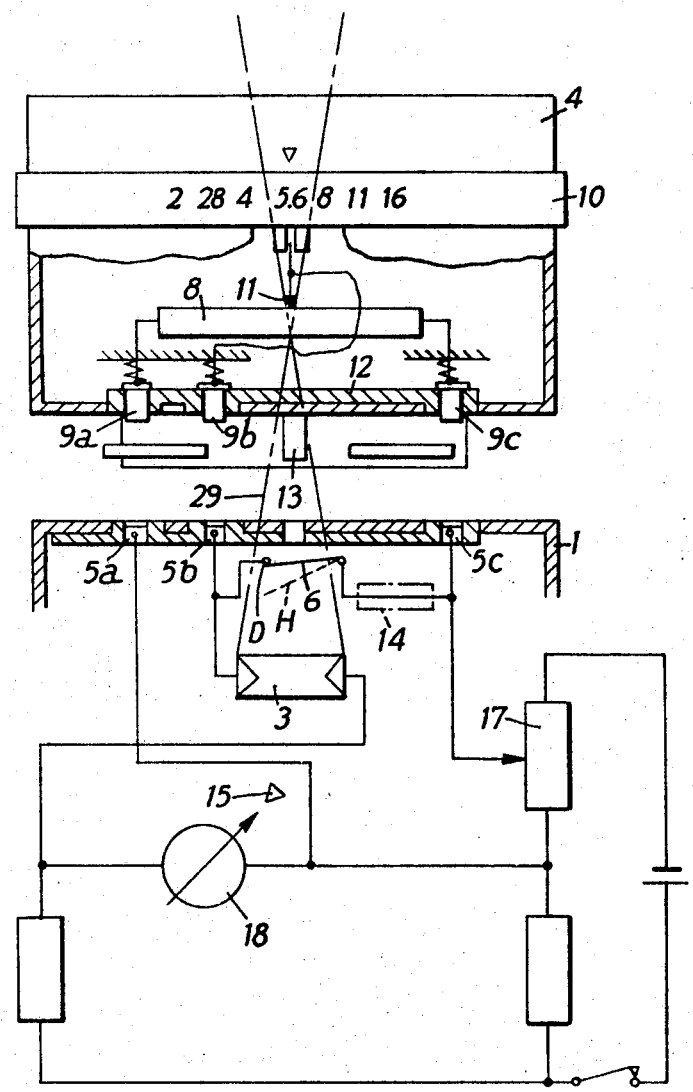
FIGURE 1 shows an arrangement with a potentiometer circuit.

In the camera housing 1 (cf. FIGURE 1), only partly shown in the drawing, the exposure measuring device is installed, and the latter is electrically connected with the counter-contacts 5a, 5b and 5c resiliently mounted on the front of the camera housing 1. Between the resilient contacts 5b and 5c is the disconnecting switch 6. The photoelectric resistance 3 is situated in the path of the rays 29 of the attachable interchangeable objective 4.

The resistance 8, connected as a voltage divider, its ends being connected with the contacts 9a and 9c, is built into the attachable interchangeable objective 4. The slider 11, which is electrically connected with the contact 9b and which slides over the resistance 8, is coupled to the diaphragm adjusting device 10. The contacts 9a, 9b and 9c are supported by the contact bridge 12, which is provided with a control pin 13 mounted opposite to the disconnecting switch 6. By the disconnecting switch 6 a correcting resistance 14 may, if necessary, be connectable or disconnectable. The interchangeable objective 4 has a preselection diaphragm which is completely open until the commencement of the exposure. The measuring operation is thus carried out with a completely open diaphragm, this being the reason for the use of the term "bright measuring."

When the interchangeable objective 4 is mounted on the camera, the contacts 9a, 9b and 9c on the objective side encounter the resilient counter-contacts 5a, 5b and 5c on the camera side, by which the resistance 8 and its slider 11 are electroconductively connected with the exposure measuring device on the camera side. At the same time the control pin 13 opens the disconnecting switch 6. Adjusting movements of the diaphragm adjusting device 10 are imparted to the slider 11 and indicated by the exposure measuring device. The setting of the diaphragm is correct, in accordance with the prevailing brightness, as soon as the galvanometer needle moves to its zero mark 15.

With the use of intermediate rings or a bellows-type closeup device, the direct connection between the interchangeable objective 4 and the exposure measuring device on the camera side is interrupted. The disconnecting switch 6 remains closed. The same conditions arise when an interchangeable objective is used that has no adjusting resistance 8 coupled with the diaphragm adjusting device 10. For the purpose of setting the diaphragm to the correct aperture in accordance with the prevailing brightness, therefore, the objective diaphragm is first of all closed, to the preselected extent, by a closing key of a kind already known in itself. By rotating the diaphragm adjusting device 10 the diaphragm aperture and thus the illumination intensity of the photoelectric resistance 3 can then be altered, until the galvanometer needle 18 has moved to its zero mark 15.

Different exposure times can be taken into account by altering the resistance 17 connected as a voltage divider, this resistance being in series with the voltage dividing resistance 8.

The invention is naturally not confined to the first embodiment illustrated. In particular, the resilient counter-contacts 5 and the contacts 9 can be provided at any desired places on the camera and the interchangeable objective, so that they can be interconnected by cable plugs 19 via a line 20 (cf. FIGURE 2). The cable plug 19a on the camera side is provided with a control pin 22 by which a disconnecting switch 23 can likewise be actuated. In this further version, an interchangeable lens 2 contains an adjusting resistance 21 which is electroconductively connected on the one hand with the contact 21b and on the other with the contact 21a, via the slider 22. When the interchangeable objective 2 is directly attached to the camera housing 27, the contacts 21a and 21b on the objective side encounter the counter-contacts 24a and 24b on the camera side, the disconnecting switch 26 being at the same time actuated by the control pin 25. In this case, needless to say, the cable connection 19a, 20 and 19a is superfluous, but it is required whenever intermediate rings or bellows-type closeup devices are employed. The method of operation is otherwise the same as in the first version (cf. FIGURE 1). Different values for film speeds $x$ and exposure times $t$ can be taken into account by varying the zero mark 28.

We claim:
1. In a photographic camera having an exposed measuring device, a housing, a detachable objective mounted on the camera housing, a moving coil galvanometer of the exposure measuring device in the housing, a photoelectric cell of said device being arranged within said housing in the light path through the optical system of the camera and being electrically connected with said galvanometer to control the current through the measuring device when the circuit of the latter is completed, an adjustable resistor within said objective, and an aperturea diaphragm of which the aperture size thereof can be preselected by a diaphragm setting device which is operatively connected with said adjustable resistor to vary the effective resistance thereof in dependance upon the aperture setting, the provision of a switch in the circuit of the measuring device, and opening means for said switch on the objective and electrical contact means, whereby with the objective mounted on the housing the switch is opened and the adjustable resistor connected by said electrical contact means into the circuit of the measuring device, and with the objective detached the switch is closed so that the current in the measuring device is controlled by the photoelectric cell.

2. A photographic camera according to claim 1, wherein the adjustable resistor is contained within the objective which is interchangeable with other objectives, said objective having a pin which opens the switch when the objective is mounted on the camera housing.

3. A photographic camera according to claim 1, wherein said electrical contact means comprise resilient contact members mounted on the objective and corresponding fixed contacts on the housing engaged by said resilient contact members when said objective is attached to the housing.

4. A photographic camera according to claim 1, wherein further electrical contact means are provided on the objective and camera housing in the form of sleeves, those on the objective being electrically connected to the adjustable resistor and those on the housing being connected with the circuit of the measuring device, a plug-in cable connection being provided between the sleeves of the objective and housing, whereby with the provision of parts between the housing and objective with the latter detached the adjustable resistor is connected into the circuit of the measuring device.

5. A photographic camera according to claim 4, wherein a further switch is provided in the circuit of the measuring device and the cable plug on the camera side is provided with a pin for operating said further switch.

References Cited
UNITED STATES PATENTS
3,163,097 12/1964 Zenyoji et al. _____ 95—10

NORTON ANSHER, Primary Examiner
R. L. MOSES, Assistant Examiner

U.S. Cl. X.R.
95—10, 64